United States Patent [19]
Sebesta et al.

[11] 3,805,674
[45] Apr. 23, 1974

[54] HYDRAULIC PRESSURE CONTROL VALVE

[75] Inventors: Gunter Sebesta, Misburg; Dieter Jordan, Ronnenberg, both of Germany

[73] Assignee: Westinghouse Bremsen-und Apparatebau GmbH, Hannover, Germany

[22] Filed: Sept. 27, 1972

[21] Appl. No.: 292,760

[30] Foreign Application Priority Data
Nov. 24, 1971 Germany............................ 2158230

[52] U.S. Cl............. 91/461, 137/625.63, 137/636.1
[51] Int. Cl............................................. F15b 13/042
[58] Field of Search ......... 91/461, 304; 137/625.63, 137/636.1, 625.66, 636.2

[56] References Cited
UNITED STATES PATENTS

| | | | |
|---|---|---|---|
| 2,804,883 | 9/1957 | Curlett | 137/636.1 |
| 3,557,829 | 1/1971 | Finley | 91/461 X |
| 3,561,488 | 2/1971 | Byers | 137/625.63 X |
| 3,563,272 | 2/1971 | Mercier | 137/625.66 |

FOREIGN PATENTS OR APPLICATIONS

| | | | |
|---|---|---|---|
| 1,298,655 | 6/1962 | France | 91/461 |

Primary Examiner—Irwin C. Cohen
Attorney, Agent, or Firm—W. F. Poore; R. W. McIntire, Jr.

[57] ABSTRACT

This invention relates to a hydraulic control apparatus having a manually operated pressure regulating valve device for controlling the operation of a fluid pressure operated supply and release valve mechanism that supplies fluid under pressure to and releases fluid under pressure from a double-acting fluid motor to control the operation thereof. The fluid under pressure for operating the supply and release valve mechanism is regulated by the manually operated pressure regulating valve device which is effective to cause the fluid under pressure delivered by a hydraulic pump to either bypass the supply and release valve mechanism and be returned to a sump or cause the operation thereof to supply fluid under pressure to one side or the other of the piston of the double-acting fluid motor. In a center position of an operating handle of the manually operated pressure regulating valve device, the delivery of the pump, which is constantly connected to a pressure limiting valve set to open at a chosen pressure, is connected to a sump to which both the inlet of the pump and the outlet of the limiting valve are also connected.

4 Claims, 1 Drawing Figure

PATENTED APR 23 1974　　3,805,674
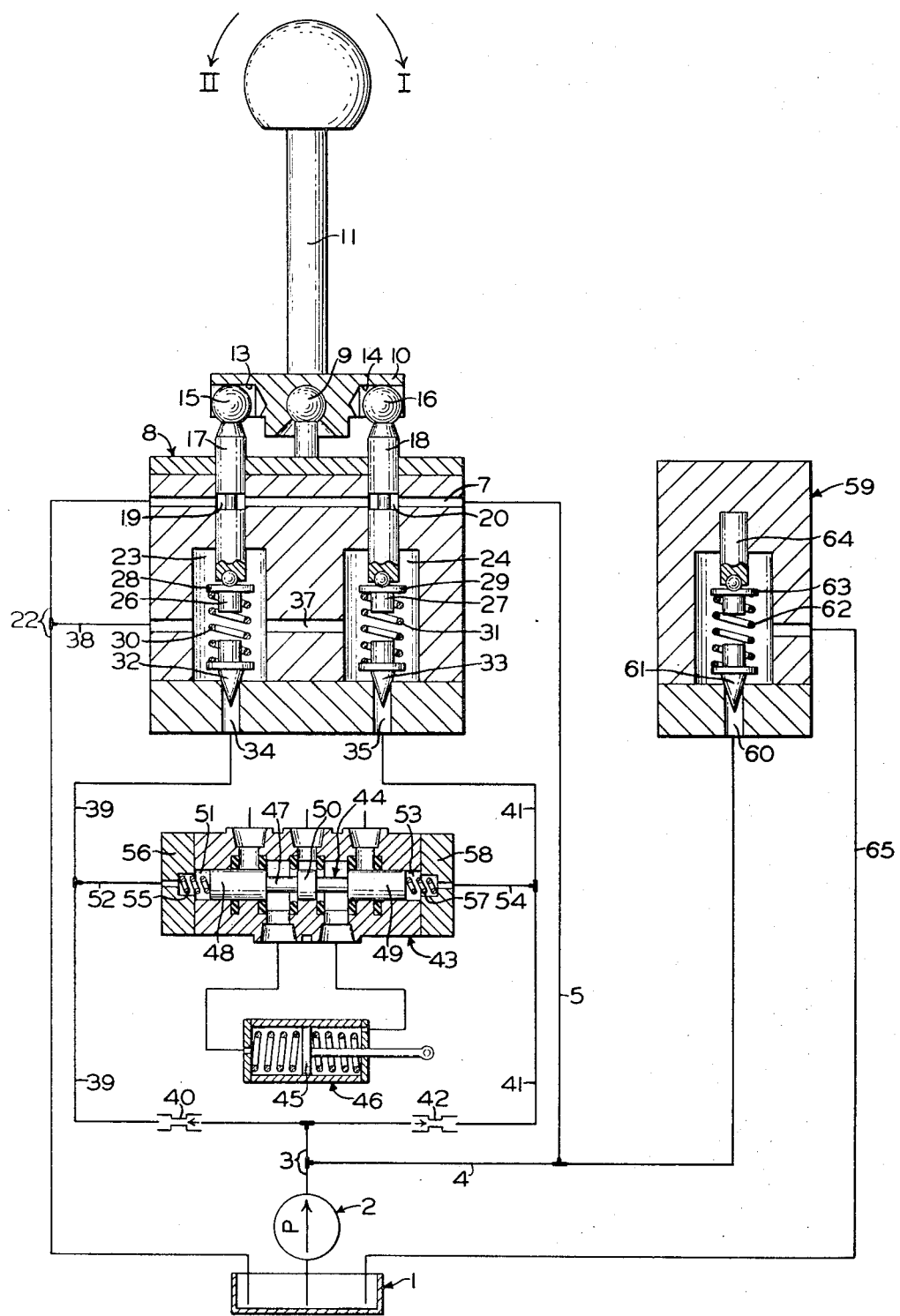

HYDRAULIC PRESSURE CONTROL VALVE

BACKGROUND OF THE INVENTION

Manually operated hydraulic pressure regulating valve devices used in previously known hydraulic control apparatus have the drawback that the hydraulic pump unnecessarily consumes energy while the operating handle of the manually operated pressure regulating valve device occupies its central position. Furthermore, excessive pump wear and heating of the hydraulic fluid circulated by the pump occurs. As a result, such hydraulic control apparatus, particularly the pressure regulating valve device, is expensive to construct. Moreover, such a hydraulic control apparatus is liable to malfunction.

Accordingly, it is the general purpose of the present invention to provide a hydraulic control apparatus of the type described above in which, while the handle of the manually operated pressure regulating valve device occupies its center position, the fluid under pressure delivered by the hydraulic pump is returned to a sump so that the elements constituting the pressure regulating valve device and also those of the limiting valve are not subject to the pump delivery pressure, thereby enabling a less expensively constructed pressure regulating valve device and also avoidance of the drawbacks listed above.

SUMMARY OF THE INVENTION

According to the present invention, a manually operated pressure regulating valve device embodies therein two cone-shaped valves, each subject to a biasing force acting in the direction to seat the respective valve. This force is variable in accordance with the position of an operating handle whereby each valve, upon a chosen reduction in its biasing force in response to movement of the operating handle in one direction or an opposite direction out of a center position, is effective to release fluid under pressure from the face of a corresponding one of a pair of spaced-apart pistons connected to the opposite ends of a supply and release spool-type valve, the operation of which, by the difference in pressure acting on the two pistons, effects the supply and release of fluid under pressure to and from the opposite sides of the piston of the double-acting fluid motor to thereby control the operation thereof. A spring is interposed between each of the two cone-shaped valves and a corresponding valve stem that is provided with a peripheral groove and movable in response to rocking of an operating handle in one direction or an opposite direction out of a central position to increase or decrease the biasing force exerted by the spring on the corresponding valve. The location of these peripheral grooves on the valve stems is such that these grooves, while the stems occupy the position corresponding to the central position of the operating handle, cooperate with passageways in a valve housing in which the stems are slidably mounted to establish a by-pass communication through which fluid under pressure discharged by the hydraulic pump is returned to the sump. Manual rocking of the handle out of its central position causes movement of the valve stems to a position to close the by-pass communication and simultaneously decrease the biasing force of the spring acting on one valve and increase the biasing force of the other spring whereupon the pump discharge pressure unseats the one valve. Upon the unseating of the one valve, pump discharge pressure is reduced on the face of the corresponding one of the pair of spaced-apart pistons connected to the spool-type valve by flow past the one valve back to the sump thus establishing a differential pressure for operating the spool-type valve.

With reference to the drawing, an example of execution of the invention is explained below in greater detail.

From a tank or sump 1, a hydraulic pump 2 transports the pressure medium via feed lines 3, 4 and 5 into a flow channel 7 of a manually actuated pressure regulating valve device 8, which is shown in the unactuated state.

The pressure regulating valve device 8 has a round-headed pin 9 in its center serving as a fulcrum for an actuation flange 10 that is integral with a hand lever 11.

In each of two recesses 13 and 14 lying opposite one another in the actuation flange 10, one of two spherical end pieces 15 and 16 of valve stems 17 and 18, respectively, is guided. Valve stems 17 and 18 have peripheral grooves or recesses 19 and 20 aligned in the illustration with the flow channel 7. The outlet side of the flow channel 7 is connected to a backflow line 22.

The lower ends of the valve stems 17 and 18 protrude into expanded chambers 23 and 24 and load corresponding valve springs 30 and 31 via spring plates 28 and 29 that are integral with guide pieces 26 and 27, which valve springs are supported on conical valve parts 32 and 33. The conical valve parts 32 and 33 close outlet passageways or channels 34 and 35 respectively and form initially tensioned and seated outflow valves 32, 34 and 33, 35.

Chambers 23 and 24 are connected with one another by an intermediate passageway or channel 37 and are connected to the backflow line 22 via a return line 38.

The passageway 34 is connected via a pipe or pressure line 39 having therein a choke 40 of constant area to the feed line or pipe 3. Likewise, the passageway 35 is connected via a pipe or pressure line 41 having therein a choke 42 of constant area to the feed line or pipe 3. The size of the two chokes 40 and 42 is the same.

A fluid pressure operated spool-type control valve device 43 comprises a spool valve 44 for controlling the supply and release of fluid under pressure to and from the opposite sides of a piston 45 of a double-acting fluid motor 46. The spool valve 44 comprises a piston rod 47 having a pair of pistons 48 and 49 formed integral with the respective ends thereof and a land 50 located midway between these pistons. As shown in the drawing, a pressure chamber 51 at the left-hand side of the piston 48 is connected by a pipe 52 to the pipe 39 intermediate the ends thereof. Likewise, a pressure chamber 53 at the right-hand side of the piston 49 is connected by a pipe 54 to the pipe 41 intermediate the ends thereof.

In order to effect movement of the spool valve 44 to the position shown in the drawing while the pump 2 simultaneously supplies fluid under pressure to the chambers 51 and 53 via the chokes 40 and 42, a first centering spring 55 is interposed between the left-hand face of piston 48 and a pressure head 56 secured to the left-hand end of the valve device 43, and a second centering spring 57 is interposed between the right-hand face of the piston 49 and a pressure head 58 secured to the right-hand end of valve device 43.

A pressure limiting valve device 59 is connected on the intake side to feed line 4 and has an inlet passageway 60 normally closed by a cone valve member 61. The valve member 61 is loaded by a valve spring 62, one end of which abuts a spring seat 63 carried at one end of a rod 64 having its opposite end fixed. On the outlet side, a return pipe 65 leads back to tank 1.

The pressure limiting valve device 59 limits the systemic pressure to a predetermined value through proper adjustment of the spring tension on the valve member 61.

While in the position shown, the spring-loaded outflow valves 32, 34 and 33, 35 are more strongly pretensioned than the pressure limiting valve 59 by a certain amount.

The mode of operation of the example described is as follows:

In the unactuated state shown of the pressure regulating valve 8, the pressure medium transported by the hydraulic pump 2 flows at a low pressure via feed lines 3, 4, 5, flow channel 7 of pressure regulating valve 8, grooves 19 and 20 and return pipe 22 back to tank 1.

In order to move the spool valve 44 of the fluid pressure operated control valve device 43 to the left, manual lever 11 of pressure regulating valve 8 is swung in the direction of arrow I. The valve stem 17 and valve stem 18 are thereby respectively moved up and down and break the connection between feed line 5 and the backflow line 22 by blocking the flow channel 7, since the grooves 19 and 20 no longer are in line with the flow channel 7.

The upward movement of valve stem 17 reduces the pre-tension of valve member 32 by releasing the valve spring 30, and the downward movement of valve stem 18 increases the pre-tension of the spring-loaded valve member 33.

The continuously operating hydraulic pump now causes pressure to build up in feed lines 3, 4, and 5 to the value of the systemic pressure set by the pressure limiting valve 59. At the same time, the systemic pressure in pressure lines 39 and 41 builds up via chokes 40 and 42 of equal size and acts against the closed cone valves 32, 34 and 33, 35 and in the actuation chambers 51 and 53 of the fluid pressure operated control valve device 43.

As the lever 11 is turned further in arrow direction I, the pre-tension of the valve member 32 decreases to below the value set on the pressure limiting valve 59 so that the systemic pressure arising opens cone valves 32, 34.

In this way, a continuous reduction in pressure in pressure line 39 and chamber 51 takes place by flow of fluid under pressure via cone valve 32, 34 into the backflow line 22, while the systemic pressure set by pressure limiting valve 59 prevails in the remaining control system.

The value of the pressure difference between the different pressures developing in actuation chambers 51 and 53 causes a corresponding movement of the spool valve 44 of the control valve device 43.

This pressure difference is preserved as long as the lever 11 remains in its assumed position. By changing the position of lever 11, the spring pre-tension of cone valve 32, 34 is changed so that a varying cross section of flow appears at cone valve 32, 34 which correspondingly changes the pressure present in pressure line 39 and chamber 51 and thus causes movement of the spool valve 44 of control valve device 43. This displacement of the spool valve is thus possible without graduation.

If the hand lever 11 is returned to the center position, the hydraulic pump 2 again pumps via pressure regulating valve 8 into the backflow line 22 so that the pressure in the pressure lines 39 and 41 and chambers 51 and 53 can be equalized, i.e. via chokes 40 and 42. Spool valve 44 of control valve device 43 is then brought to its center position by centering springs 55 and 57.

Movement of the spool valve 44 of the control valve device 43 to the right is achieved by actuating lever 11 in arrow direction II. The mode of function of this process corresponds to that described above.

The pressure regulating valve 8 can be designed as a fourway valve so that two control valves can be actuated.

Having now described the invention, what we claim as new and desire to secure by Letters Patent, is:

1. In a fluid pressure operated control apparatus including a pump and a fluid motor having a double acting piston wherein fluid under pressure supplied from the pump effects the remote control operation of the fluid motor, the combination of:
   a. a fluid pressure operated control valve device having a valve element subject at its respective opposite ends to two equal pressures supplied thereto by the pump and operable in response to a reduction of one of said equal pressures without effecting a reduction of the other to simultaneously effect the supply of fluid under pressure to one side of the double-acting piston of the fluid motor and the release of fluid under pressure from the other side,
   b. a pair of chokes of equal size, each effective to control the establishment of one of said two equal pressures, and
   c. a manually operated regulating valve device comprising:
      i. a pair of valves, each operative when open to effect a reduction in a corresponding one of said two equal pressures,
      ii. biasing means for each of said valves normally effective to close the respective valve thereby preventing it from effecting a reduction in the corresponding one of said equal pressures,
      iii. means for so controlling said biasing means as to simultaneously increase the bias on either one of said valves and decrease the bias on the other valve until said other valve is opened by the corresponding one of said two equal pressures to cause said reduction in said corresponding one pressure to thereby render the other of said two pressures effective to operate said valve element to simultaneously cause the supply of fluid under pressure to one side of the double-acting piston and the release of fluid under pressure from the other side, and, wherein the improvement comprises,
      iv. means operable upon effecting an equal bias on each of said valves to establish a fluid pressure communication in bypass of both of said chokes, said means for controlling said biasing means comprises a pair of movable cylindrical members each provided with a peripheral groove, and said grooves, only while said cylindrical members occupy the position to establish an equal bias on each of the valves, constituting said fluid pressure communication bypass means, whereupon each choke is thereafter effective to establish the same minimum pressure, said minimum pressures acting in opposite directions on said valve element to thereby render said valve element ineffective to supply fluid under pressure to either side of the double-acting piston.

2. In a fluid pressure operated control apparatus, as recited in claim 1, further characterized in that each of said pair of valves constitutes a cone.

3. In a fluid pressure operated control apparatus, as recited in claim 1, further characterized by a limiting valve device for limiting the degree of said two equal pressures.

4. In a fluid pressure operated control apparatus, as recited in claim 1, further characterized in that said regulating valve device comprises a housing having a passageway therein and a pair of spaced-apart parallel bores each intersecting said passageway and each having one of said cylindrical members slidably mounted therein whereby said grooves on said cylindrical members cooperate with said passageway, only while said members occupy the position to establish an equal bias on each of said valves, to establish a communication in by-pass relation to said valves and said chokes thereby enabling said chokes effective to establish said two equal minimum pressures.

* * * * *